3,232,646
GIMBAL RING TYPE FLEXIBLE COUPLING
Frank Henry Stark, Derby, England, assignor to Rolls-Royce Limited, Derby, England
Filed Oct. 22, 1962, Ser. No. 231,989
Claims priority, application Great Britain, Oct. 23, 1961, 37,967/61
3 Claims. (Cl. 285—226)

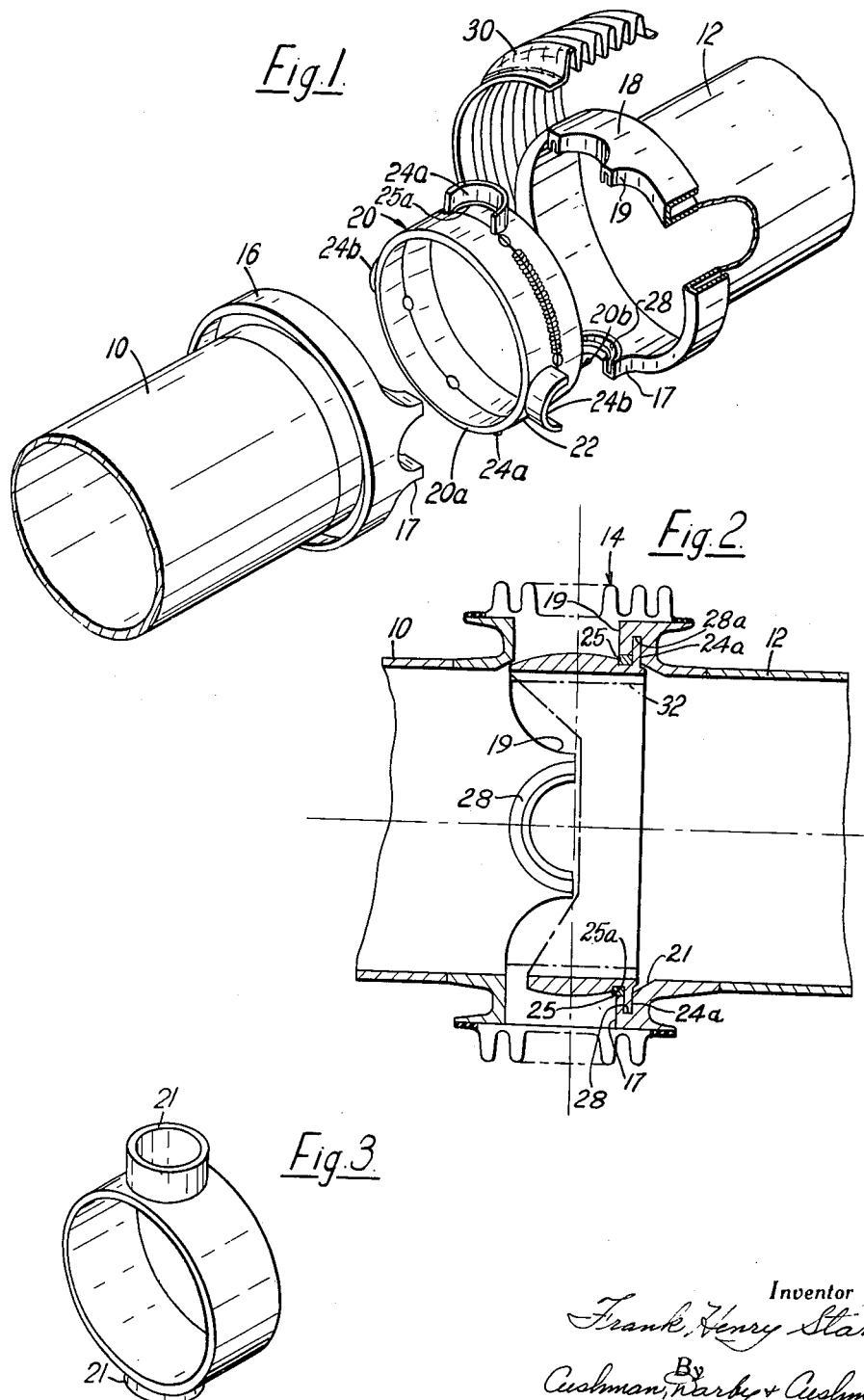

This invention relates to flexible couplings for pipes and the like of the kind comprising two annular end parts, one for connection to each of the pipes or the like to be connected together, the two end parts being connected together by a universal joint. The universal joint comprises a gimbal ring adapted to be supported in the end parts by two sets of pivot members, formed either on the ring or the end parts, each set comprising two pivot members arranged diametrically opposite to each other and with their axes disposed perpendicular to the axes of the other set of pivot members.

A tubular flexible member is also arranged to extend between and be connected to the end parts to prevent the egress of fluid passing the pipes of which the coupling forms part.

According to the present invention the pivot members comprise arcuate members each of which is adapted to engage in a corresponding arcuate groove formed in the part which is to be connected thereto, each set of pivot members being disposed on opposite sides of the transverse axis of the gimbal ring.

Preferably each pivot member and the groove in which it is to engage subtend an arc of 180°.

A heat shield may be disposed within the coupling and arranged to extend circumferentially of the bore of the gimbal ring and to be spaced radially inwardly thereof to define a space between the outer face of the shield and the bore of the gimbal ring.

The heat shield may comprise an annular metal ring connected to the gimbal ring, or it may comprise two annular rings, one carried by one end part and the other carried by the other end part, each of the two annular rings being adapted to extend beyond the transverse centre line of the gimbal ring, and one being adapted to be disposed within the other, so that the two overlap.

The heat shield is employed where heat will be generated within the pipes between which the flexible coupling is interposed to reduce the transmission of heat to the flexible member connected between the end parts.

If desired an adjusting member may be interposed between the end of each pivot member remote from the gimbal ring and the base of the groove, to compensate for radial clearances between the end of the pivot member and the base of the groove.

It will be seen therefore that the present invention provides a flexible coupling in which the pivot members form an integral part of the gimbal ring, and that no additional connecting means are required to connect them to the end parts.

According to a further feature of the invention there is provided a method of manufacturing a gimbal ring and its pivot members and mounting it in the end parts, the said method comprising the steps of attaching two annular members to the outer periphery of an annular ring in diametrically opposed positions, and on a common transverse axis, cutting the ring into two pieces along the common transverse axis, mounting one piece of the ring into each of the end parts, arranging the end parts so that the axis of the two sets of pivot members are disposed at 90° to each other and connecting the two pieces together.

The method of mounting each piece in an end part comprises the steps of disposing the piece within the end part with its longitudinal axis parallel to the longitudinal axis of the end part and with the pivot members in the same plane as the bores in the end piece, pivoting the piece about transverse axis of the pivot members until the pivot members engage in the bores in the end part.

Preferably the two pieces are joined together by welding.

In order that the invention can be clearly understood and readily carried into effect, a flexible coupling in accordance with the invention, together with the method by which it can be assembled, will now be described by way of example only with reference to the accompanying drawings in which, FIGURE 1 is an exploded view of the coupling,
FIGURE 2 is a sectional view of the assembled coupling and its associated pipes, and
FIGURE 3 is a perspective view showing the first step in the manufacture of a gimbal ring for use in the coupling shown in FIGURE 1.

Referring to the drawings two parts 10 and 12 of a pipe are interconnected by a flexible coupling 14 which comprises two end parts 16 and 18 connected together by an annular gimbal ring 20, having a part spherical outer surface 22.

The gimbal ring 20 has two pairs or sets of pivot members 24a and 24b, the members of each pair of pivots are disposed in diametrically opposed relationship, and each pair has its pivotal axis disposed at right angles to the pivotal axis of the other pair. Thus four equally spaced pivots are provided on the gimal ring 20.

As can be seen from FIGURE 1 of the drawings, each pivot member 24a or 24b comprises one half of an annular member, the pivot members of one pair being disposed on one side of the transverse axis of the ring, whilst the other pair of pivot members is disposed on the other side of the transverse axis. It will also be seen from FIGURE 1 of the drawings that the gimbal ring 20 consists of two annular rings 20a and 20b joined together by welding after the rings have been mounted in the end parts 16 and 18, the abutting edges forming the aforementioned transverse axis of the rings as a whole.

The gimbal ring is produced as follows. A solid ring, as shown in FIGURE 3 of the drawings, having an axial length which is equal to the combined axial length of the two rings 20a and 20b has two annular members 21 mounted thereon in diametrically opposed positions, and on the transverse axis of the ring. The ring is then cut into two pieces along the transverse axis whereby the two rings 20a and 20b are formed, each having two arcuate members thereon which are semi-circular in cross section and which form the pivot members 24a and 24b. The two rings are then mounted in the respective end part 16 or 18 and the two rings brought together with the axes of the pivot members disposed at 90° to each other and in this position a welded joint is effected between the two rings as indicated at 26 in FIGURE 1.

Two holes are formed between each pivot member, into which welding metal can pass.

The welded joint can only be effected between the pivot members 24a and 24b and not over that part of the peripheral extent of the abutting edges of the rings which is bounded by a pivot member since with a gimbal ring in accordance with the invention the welding can only be carried out when the rings 20a and 20b have been mounted in an end part prior to welding.

The method of mounting each piece (20a, 20b) in an end part comprises the step of disposing the piece within the end part with its longitudinal axis parallel to the longitudinal axis of the end part (16, 18) with the pivot members in the same plane as the bores in the end part, and with the ends of the pivot members aligned with the ends of the groove and then pivoting the piece about its transverse axis until the pivot members engage in the bores in the end part.

The two end parts 16 and 18 are initially produced as an integral whole, the two portions of the whole which will form the end parts being connected together by two diametrically opposed pieces 17 and 19.

A hole is drilled in each of the opposed pieces 17 and 19, and a drill is then passed into the hole which is capable of boring an annular groove 28 from the inner surface of the piece in a radially outward direction. When the annular grooves 28 have been drilled the whole is then split into two pieces to provide the end parts (16, 18) shown in FIGURE 1, the grooves 28 on each of the end parts 16 and 18 now being arcuate or semi-circular in cross section.

Each end part 16 and 18 is enlarged at its inner end, as shown at 21 in FIGURE 2, to receive the gimbal ring 20 and is provided with two arcuate grooves 28 which are arranged in diametrically opposed relationship, and adapted to receive the pivot members 24a and 24b and permit pivotal movements of the gimbal ring relative to the end part. An adjusting member 25 is interposed between the end of each pivot member (24a, 24b) and the base of its respective groove 28 with which it is engaged. It will be noted in FIGURE 2 that a groove 25a is provided in the body of the gimbal ring 20 at the base of each of the arcuate pivot members 24a and 24b on the inner side thereof. Since the groove 25a is made prior to the cutting of the ring 20 into the rings 20a and 20b, the groove will be arcuate and therefore the adjusting member 25 must also be arcuate to fit in the same. The adjusting member 25 may be made of any stiff material but is preferably metal and it functions to prevent lateral movement of the gimbal ring along the two axes of the pivot members 24a and 24b perpendicular to the longitudinal axis of the pipe parts 10 and 12.

To prevent fluid passing through the pipe leaking out of the coupling, a flexible bellows 30 is arranged externally around the coupling formed by the gimbal ring 20 and the enlarged inner ends of the end parts 16 and 18, opposite ends of the bellows 30 being secured to the end parts in a fluid tight manner, for example by welding.

It may also be desirable to provide a heat shield within the gimbal ring to reduce the transfer of heat to the bellows 30 when the pipe is employed for the conveyance of a hot fluid.

The heat shield may comprise an annular metal ring 32, shown in chain dotted lines in FIGURE 2 of the drawings, whose outer diameter is less than the bore of the gimbal ring 20, which when mounted within the bore of the gimbal ring is radially inwardly spaced therefrom to define an air space between the bore of the ring 20 and the outer periphery of the ring 32.

Thus the transfer of heat to the bellows 30 is reduced.

Alternatively the heat shield may comprise two annular metal members, not shown, one of which is supported by the end part 16 and the other of which is supported by the other end part 18. One member is adapted so that it can pass into the other member, and both have an axial length which is such that each extends beyond the transverse axis of the gimbal ring whereby their free ends overlap.

The larger of the two members also has an outer diameter which is less than the bore of the gimbal ring 20, whereby a space is defined between the outer periphery of the two members and the bore which when hot fluid is passing through the pipe reduces heat transfer to the bellows.

It will be seen therefore that the invention provides a flexible coupling in which the pivot members form an integral part of either the gimbal ring or the end parts and that additional retaining members are not required.

I claim:

1. A flexible coupling for two pipe parts comprising: two annular end parts respectively connected to the ends of the two pipe parts, each of said annular end parts having two oppositely disposed axially extending pieces provided with diametrically opposite arcuate grooves formed in the inner face of said axially extending pieces; and a gimbal ring interconnecting said end parts, said gimbal ring having two sets of pivot members, each of said pivot members being ring like and of arcuate shape and arranged on opposite sides of a plane passed transversely to the longitudinal axis of the gimbal ring, the open side of each of said pivot members facing said plane with said pivot members having an axis of curvature lying substantially on said plane, one set of pivot members having their axes disposed perpendicular to the axes of the other set of pivot members, each set having two arcuate pivot members corresponding in shape to said grooves, the two arcuate pivot members of one set being received in the diametrically opposite arcuate grooves of one of said end parts and the two arcuate pivot members of the other set being received in the diametrically opposite arcuate grooves of the other of said end parts.

2. A flexible coupling as claimed in claim 1, in which each arcuate pivot member and the arcuate groove in which it is to engage each subtend an arc of substantially 180°.

3. A flexible coupling as claimed in claim 1 in which an adjusting member is interposed between the end of each pivot member and the base of the groove in which it is engaged.

References Cited by the Examiner

UNITED STATES PATENTS

| 840,325 | 1/1907 | Hawley | 285—265 |
| 1,547,482 | 7/1925 | Woodruff | 285—265 |
| 1,860,605 | 5/1932 | Baldwin | 29—157 |
| 2,027,176 | 1/1936 | King | 29—157 |
| 2,616,728 | 11/1952 | Pitt | 285—261 X |
| 2,936,185 | 5/1960 | Olsen et al. | 285—265 X |
| 3,112,129 | 11/1963 | Willis et al. | 285—226 |

FOREIGN PATENTS 809,656   2/1959   Great Britain.

CARL W. TOMLIN, *Primary Examiner.*